United States Patent
Png et al.

(10) Patent No.: US 8,250,377 B2
(45) Date of Patent: Aug. 21, 2012

(54) SOFTWARE COPYRIGHT PROTECTION AND LICENSING SYSTEM USING RFID

(75) Inventors: Eak Hock Adrian Png, Singapore (SG); Shao Yann Benedict The, Singapore (SG); Hui Lin Serena Goh, Singapore (SG)

(73) Assignee: Nanyang Polytechnic, Singapore (SG)

( * ) Notice: Subject to any disclaimer, the term of this patent is extended or adjusted under 35 U.S.C. 154(b) by 378 days.

(21) Appl. No.: 12/515,011

(22) PCT Filed: Oct. 5, 2007

(86) PCT No.: PCT/SG2007/000340
§ 371 (c)(1),
(2), (4) Date: Nov. 30, 2009

(87) PCT Pub. No.: WO2008/060242
PCT Pub. Date: May 22, 2008

(65) Prior Publication Data
US 2010/0229000 A1 Sep. 9, 2010

(30) Foreign Application Priority Data
Nov. 17, 2006 (SG) .................... 200607989

(51) Int. Cl.
*G06F 11/30* (2006.01)
(52) U.S. Cl. .............. 713/190; 380/270; 370/335
(58) Field of Classification Search ............. 380/270; 370/335
See application file for complete search history.

(56) References Cited

U.S. PATENT DOCUMENTS

| 6,836,472 B2 * | 12/2004 | O'Toole et al. ............... 370/335 |
| 2002/0129265 A1 | 9/2002 | Watanabe |
| 2003/0028787 A1 | 2/2003 | Fayed et al. |
| 2006/0133609 A1 | 6/2006 | Rodriguez et al. |
| 2006/0291657 A1 * | 12/2006 | Benson et al. ............... 380/270 |

FOREIGN PATENT DOCUMENTS

| EP | 1637957 A1 | 3/2006 |
| EP | WO2007/118591 A1 | 10/2007 |

OTHER PUBLICATIONS

Examination Report for GR0908339.5 from the UK Patent Office dated Oct. 28, 2010 (1 page).

* cited by examiner

*Primary Examiner* — Nathan Flynn
*Assistant Examiner* — Phuoc Tran
(74) *Attorney, Agent, or Firm* — Pyprus Pte Ltd (57) ABSTRACT

The present invention provides a software copyright protection and licensing system (200) using RFID. A RFID tag (110) is supplied with a software package (100). During installation of the software package in a computer, a RFID reader (158) interrogates the RFID tag (110) for a product installation and licensing key (114). During installation of the software, an installation signature (TSig) is generated and stored in the RFID tag and computer, operation of the software is allowed if the installation signatures tally, otherwise permission is denied. Further, the system (200) allows reinstallation (process C) of the software and/or re-generation (process D) of a new installation signature under certain situations.

20 Claims, 7 Drawing Sheets

SOFTWARE COPYRIGHT PROTECTION AND LICENSING SYSTEM USING RFID

FIELD OF INVENTION

The present invention relates to software copyright protection and licensing system using radio-frequency identification.

BACKGROUND

Most commercial computer softwares are distributed with licenses. For example, in a retail shop, softwares are distributed in packages that are shrinked-wrapped. A so-called "shrink-wrap" license accompanies each software package. Such software licensing is based on a licensee's trust and honesty to abide by the license agreement, for example, by breaking the shrink-wrap and agreeing to install a copy of the software in only one computer. In a similar manner, a "site" license allows a licensee to install a predetermined number of copies of a software in many computers, for example, at a site or organisation.

Figure 1A:
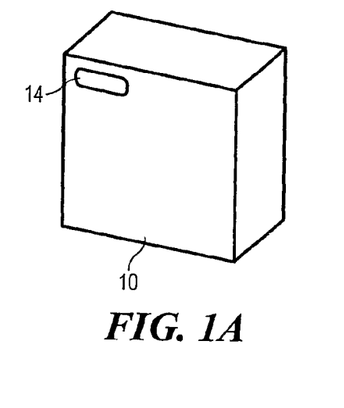
Figure 1B:
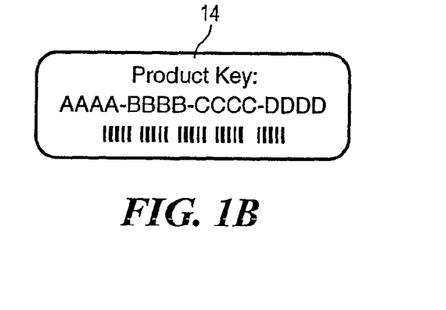
FIG. 1B illustrates a conventional product installation key accompanying the software package.

To enable a licensee to install a software package 10, a product installation key 14, as shown in FIGS. 1A and 1B, typically consisting of 16 alphanumeric characters, is also included in the software package. To begin installation of the software package, an installation manager prompts a licensee to enter the product installation key 14. The installation manager then authenticates the software to ensure that the software is genuine before the software is installed into the computer.

These software product installation keys in the form of alphanumeric characters are visible and, thus, cannot prevent a software from being installed in more than the agreed number of copies. Enforcement of copyright of these softwares depends very much on the licensee's organizations that own these softwares. It is obvious that enforcement of copyright of softwares installed in homes or small businesses is less effective.

To ensure more effective enforcement of softwares copyright and licensing, attempts have been made to distribute softwares that require dongles. Each dongle is connected to one of the I/O ports of a computer. Such a protected software queries the I/O port to which a dongle is connected at start-up and at predetermined time intervals during its operation. This means a licensee can only run one copy of the software with a dongle supplied with the software. However, this does not prevent a user from making copies of the software in other machines and operating the software therefrom.

It can thus be seen that there exists a need for another system for protecting the copyright of softwares and ensuring more effective licensing control. The present invention also aims to overcome the disadvantages of the existing prior art.

SUMMARY

The following presents a simplified summary to provide a basic understanding of the present invention. This summary is not an extensive overview of the invention, and is not intended to identify key features of the invention. Rather, it is to present some of the inventive concepts of this invention in a generalised form as a prelude to the detailed description that is to follow.

In one embodiment, the present invention provides a software copyright protection and licensing system using radio-frequency identification (RFID). The system comprises: a RFID tag accompanying a software package, said RFID tag contains at least a product installation and licensing key of the software; and a RFID reader in communication with a central processing unit (CPU) of a computer and the RFID tag; wherein during execution of the software into the CPU, the RFID reader interrogates the RFID tag for the software's product installation and licensing key; said system generates an installation signature ($ISig_{tag}$) from the product installation and licensing key and allowing execution of the software when the $ISig_{tag}$ tallies with the installation signature ($ISig_{pc}$) stored in the CPU when the software was first installed, or denies execution when the installation signatures do not tally.

In another embodiment, the present invention provides a method of enforcing software copyright and license comprising: supplying a RFID tag with a software package, said RFID tag containing at least a product installation and licensing key; communicating a RFID reader with a central processing unit (CPU) of a computer and the RFID tag; allowing installation of the software in the CPU if the product installation key is valid, otherwise denying installation of the software package; during installation of the software, prompting a licensee for licensee information, encrypting the licensee information, sending the encrypted licensee information to the RFID tag and generating an installation signature (ISig) for storage in the CPU; and allowing the software to operate if an installation signature obtained from the RFID tag tallies with the installation signature stored in the CPU, otherwise exiting the software operation.

In yet another embodiment, the present invention provides a computer product. The computer product comprises: a software package; a RFID tag accompanying the software package, said RFID tag containing at least a product installation and licensing key for installing the software; and an amount of adhesive for attaching the RFID tag onto a casing of a central processing unit (CPU) of a computer in which the software is operable; wherein a RFID reader in communication with the CPU and the RFID tag allows installation of the software if the RFID tag is valid.

In a further embodiment, the installation signature (ISig) comprises a unique identification and a product identification of the software in addition to the licensee information. Preferably, the licensee information comprises one or more of the following: a license number and licensee's name, address and/or contact numbers.

In yet a further embodiment, the RFID tag has a line and/or an area of weakness surrounding a miniature component of the RFID tag. Preferably, the miniature component of the RFID tag may be a memory chip, a resistor and/or a capacitor.

BRIEF DESCRIPTION OF THE DRAWINGS

This invention will be described by way of non-limiting embodiments of the present invention, with reference to the accompanying drawings, in which:

FIG. 1A illustrates a conventional shrink-wrapped software package, while

DETAILED DESCRIPTION

One or more specific and alternative embodiments of the present invention will now be described with reference to the attached figures. It shall be apparent to one skilled in the art, however, that this invention may be practised without such specific details. Some of the details may not be described at length so as not to obscure the invention. For ease of reference, common reference numerals or series of numerals will be used throughout the figures when referring to the same or similar features common to the figures.

Figure 2A:
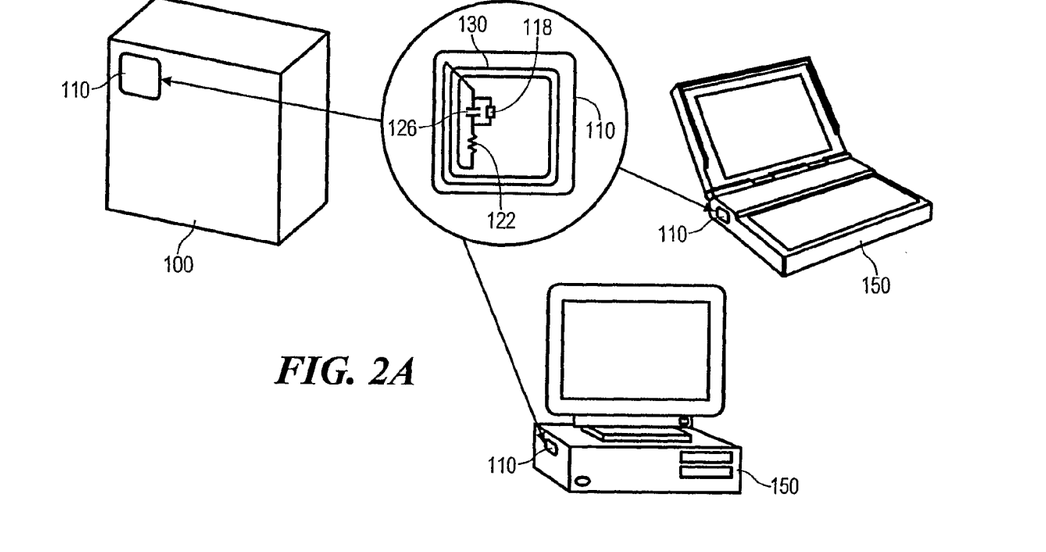
FIG. 2A illustrates a software copyright protection system using radio-frequency identification in accordance with an embodiment of the present invention.

FIG. 2A shows a software package 100 with a radio-frequency identification (RFID) tag 110 according to an embodiment of the present invention. The RFID tag 110 is schematically made up of a memory chip 118 connected to a resistor 122, a capacitor 126 and an antenna 130. In one embodiment, the RFID tag 110 around the memory chip 118 is weakened, for example, by a perforated line. In another embodiment, the backing behind the memory chip 118 is thinner compared to the rest of the RFID tag 110. In yet another embodiment, a line or area of weakness surrounds the miniature components of the RFID tag such as the memory chip 118, resistor 122 and/or capacitor 126. It is also possible to provide a line of weakness across one or more coils of the antenna 130.

Figure 3A:
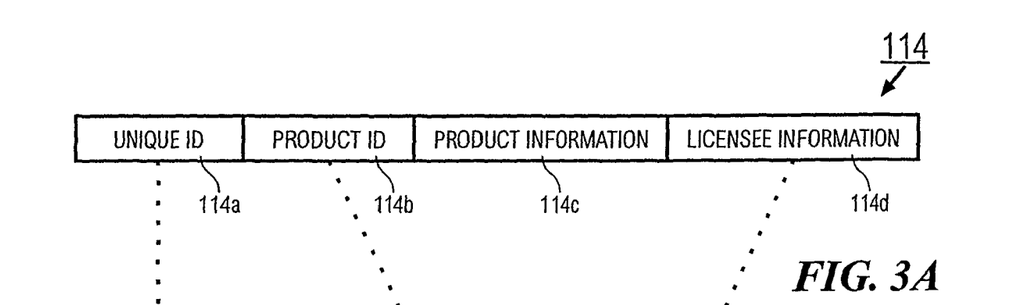
FIG. 3A illustrates components of a product installation and licensing key according to another embodiment of the present invention.

During manufacture of the software package 100, the memory chip 118 of the RFID tag 110 is encrypted with a unique product installation and licensing key 114. Other information such as manufacturing date, recommended retail price, destination market, and so on, may also be encrypted in the memory chip 118. Further information, such as licensee information, number of available licenses, associated computer device number, may be written into the RFID tag 110 via a RFID reader 158 when the tag 110 is in use. FIG. 3A shows the product installation and licensing key 114 is encoded with at least the following information: unique identification 114a; product identification 114b; product information 114c; and licensee information 114d.

Figure 2B:
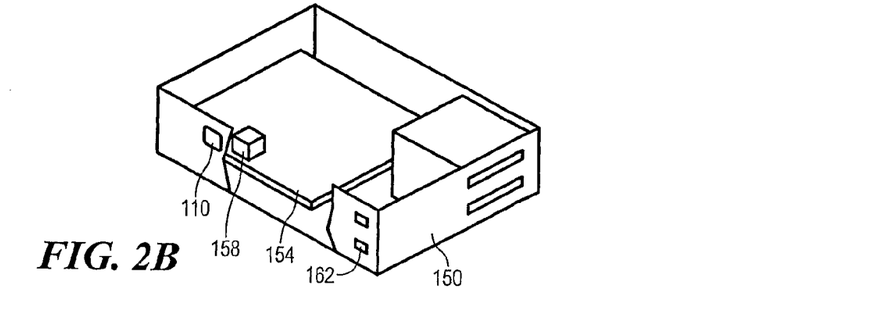
FIG. 2B illustrates a computer with a radio-frequency identification reader built onto a mother-board according to another embodiment of the present invention.

After purchasing a software package 100, a user implicitly agrees to the terms of the license agreement, tears off the shrink-wrap from the package and sticks the RFID tag 110 onto a side of a computer's casing 150, as shown in FIGS. 2A and 2B. FIG. 2B also illustrates the computer having a mother-board 154 and a RFID reader 158 built on the mother-board 154. As shown in FIG. 2B, the RFID tag 110 and RFID reader 158 are in close proximity to each other. In an embodiment, the RFID operates at a medium frequency, typically around 13.5 MHz, and the distance between the RFID tag 110 and reader 158 is substantially in a range of from about 2 cm to about 20 cm. Preferably, the plane of the RFID tag 110 is perpendicular to the radio-frequency flux radiating from the RFID reader 158 such that the radio-frequency flux and the antenna 130 are optimally coupled.

Figure 3B:
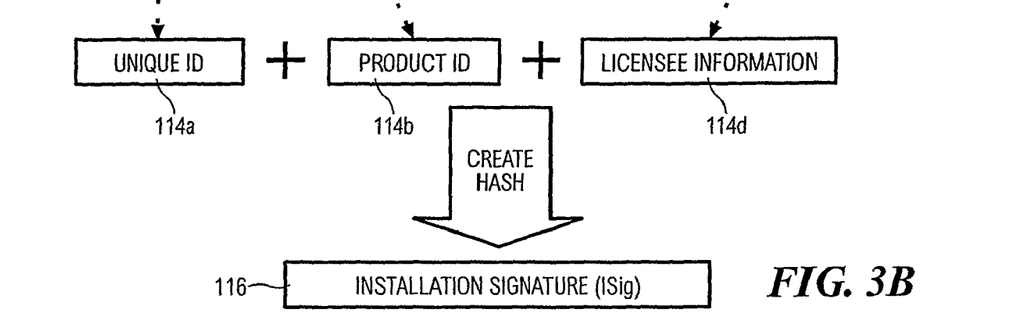
FIG. 3B illustrates an installation manager generating a secure installation signature (ISig) according to another embodiment of the present invention.

After a licensee (user) has removed the software medium, such as, a compact disc and inserted it into an optical drive, an installation manager in the software package 100 invokes the RFID reader 158 to read the product installation and licensing key 114 from the RFID tag 110 without the licensee having to read and manually enter the product installation and licensing key 114. As shown in FIG. 3B, the RFID reader 158 decodes the product installation and licensing key 114. The installation manager then extracts the unique identification 114a, product identification 114b and licensee information 114c, and creates an installation hash or signature (ISig) 116. The installation hash or signature (ISig) 116 is a secure file stored in the computer and is used to verify the copyright and licensing of the software package 100; these verifications will be clearer when the installation and execution of a software package according to the present invention is described in FIG. 4.

An advantage of the present copyright protection and licensing system is that the product installation and licensing key 114 is in an electronic form and cannot be visually read. By storing the product installation and licensing key 114 in the memory chip 118 of the RFID tag 110, the present invention helps to enforce software copyright protection. In addition, users are prevented from installing unauthorised copies of the software in separate machines. Thus, enforcement of software licensing becomes more effective. Further, with the line of weakness and/or the thin backing on the RFID tag 110, these features help to discourage a licensee from tampering with the RFID tag 110 after it is attached to the casing 150 of a computer's CPU.

Figure 4:
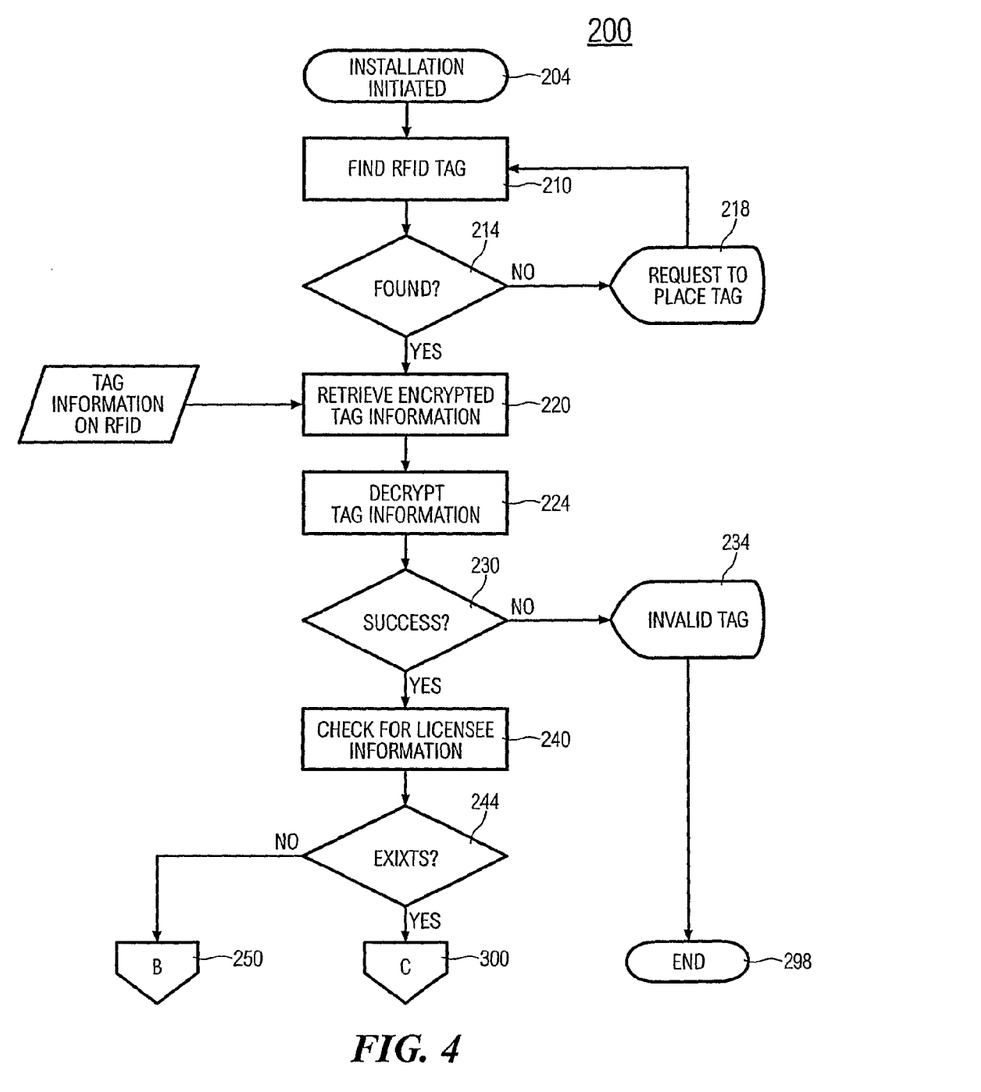
FIG. 4 illustrates an installation process of a software package according to another embodiment of the present invention.

FIG. 4 illustrates an installation process 200 of a software package according to another embodiment of the present invention. As shown in FIG. 4, the installation process 200 is started by a user initiating, in step 204, to install the software package 100 into a computer. For example, the user removes the software medium, such as a compact disc and inserts it into an optical drive in the computer. Upon the computer's operating system detecting the installation medium and executing the installation command, an installation manager in the software medium invokes the RFID reader 158, in step 210, to scan the RFID tag 110 that is supplied with the software package 100. A decision is made, in step 214, whether the RFID tag 110 is present. If the RFID tag 110 is attached to the recommended region on a side of the computer casing 150 and is within interrogation range of the RFID reader 158, the decision in step 214 is positive, ie. "yes" and the process proceeds to step 220.

If the decision in step 214 is "no", the installation manager issues a message to the user, in step 218, prompting the user to attach the RFID tag 110 at a recommended position. After elapse of a time interval, the installation manager again requests the RFID reader 158 to interrogate the RFID tag 110. In another embodiment, the RFID interrogation is repeated for a predetermined period of time, after which, the installation manager exits the installation process. In yet another embodiment, the installation manager prompts the user whether to continue with the installation process; if the user so wishes, the installation manager re-executes process steps 210 and 214. If not, the installation manager exists the installation process.

When a RFID tag 110 is detected by the RFID reader 158, in step 214, the RFID reader 158 sends out a burst of radio-frequency waves and interrogates the RFID tag in step 220.

Powered by the radio-frequency waves inducting the RFID tag's antenna 130, the RFID tag 110 responds by encrypting the product installation and licensing key 114 from it memory chip 118 and sends a burst of return radio-frequency waves through the antenna 130 back to the RFID reader 158. In step 224, the installation manager requests the RFID reader 158 to decrypt the product installation and licensing key 114 from the RFID tag 110.

A decision is then made, in step 230, whether the product installation and licensing key 114 is successfully transmitted by the RFID tag 110 and decrypted by the RFID reader 158. If the decision in step 230 is negative, ie. "no", the installation manager considers the RFID tag to be invalid, and proceeds to step 298 and ends the installation process 200.

If the decision in step 230 is positive, ie. "yes", the installation manager extracts the licensee information 114d from the product installation and licensing key 114 that was already de-crypted by the RFID reader 158. A decision is then made, in step 244, whether the licensee information 114d exists.

If the software package 100 is new and the licensee information 114d does not exist, the installation manager proceeds to step 250. In step 250, a new installation process B is started. If the decision in step 244 is positive, the installation manager proceeds to process C. In process C, the software package 100 is reinstalled in step 300.

Figure 5:
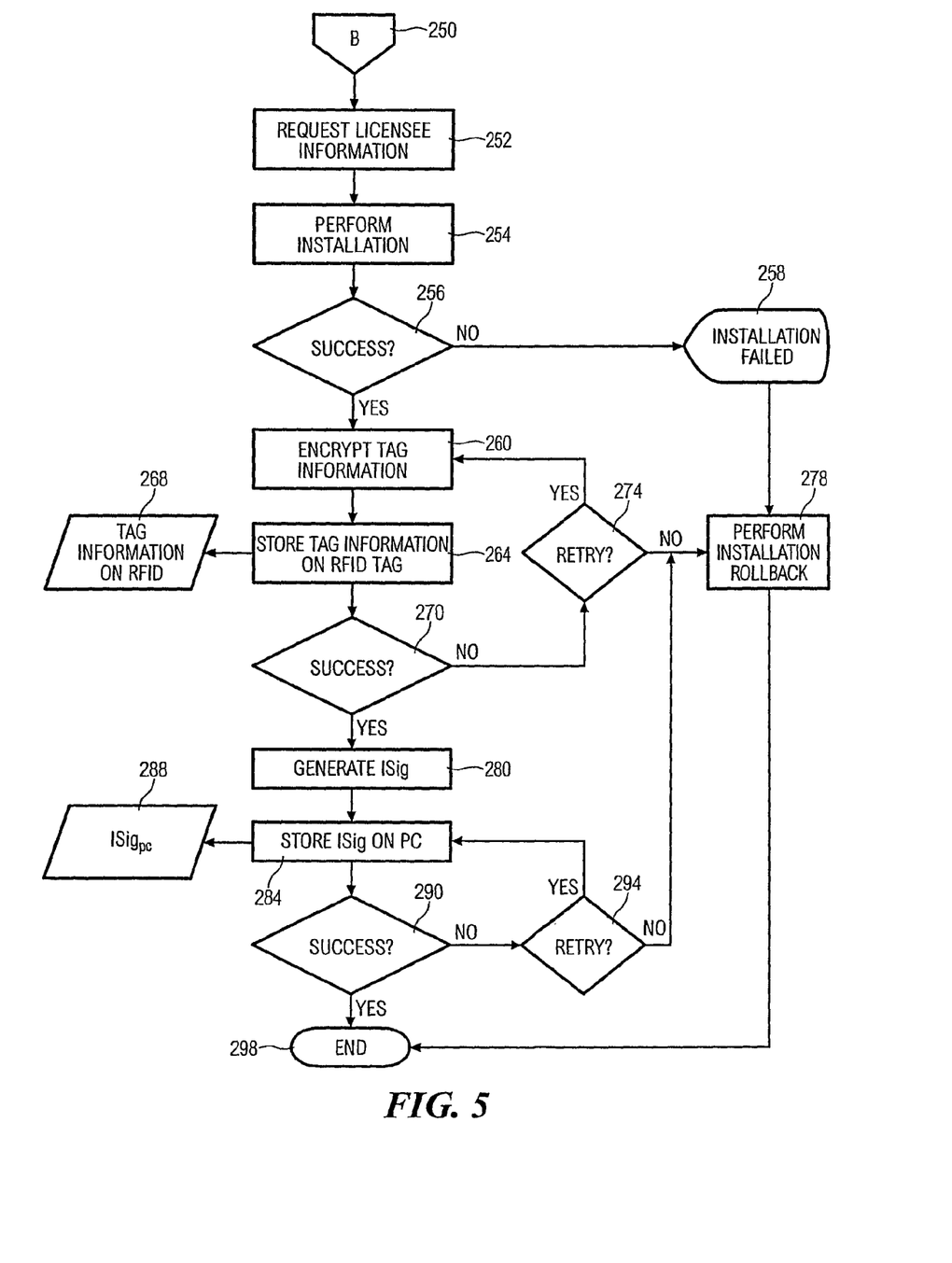
FIG. 5 illustrates an installation process (B) of a new software package according to another embodiment of the present invention.

FIG. 5 illustrates a new software installation process B according to another embodiment of the present invention. As shown in FIG. 5, the new software installation process B starts from step 250. In step 252, the installation manager requests the user (licensee) for the licensee information. The licensee information may include the licensee name; address; and telephone, facsimile and/or email contact. As soon as the required licensee information is entered by the licensee, the installation manager proceeds to step 254.

In step 254, the installation manager installs the software package 100 into the licensee's computer. At the end of the installation process, a decision is made, in step 256, whether the installation is successful. If the decision in step 256 is negative, the installation manager determines, in step 258, that the installation has failed. As a result, the installation manager executes, in step 278, an installation roll-back and removes the software components that were installed by the installation manager, before ending the installation process in step 298.

If the decision in step 256 is positive, the installation manager proceeds to step 260. In step 260, the installation manager sends the licensee information 114d to the RFID reader 158 for the licensee information 114d to be updated into the product installation and licensing key 114. The updated product installation and licensing key 114 is then encrypted, also in step 260, and transmitted to the RFID tag 110, in steps 264 and 268. A decision is then made in step 270 whether the licensee information 114d is encrypted and transmitted to the RFID tag 110.

If the decision in step 270 is negative, the installation manager prompts the licensee, in step 274, whether to retry encrypting and transmitting the licensee information 114d to the RFID tag 110. If the licensee's decision in step 274 is positive, the installation manager repeats process steps 260, 264 and 268 accordingly. In another embodiment, a number of retry in step 274 is predetermined. If the decision in step 274 is negative, the installation manager performs an installation roll-back in step 278 before ending the installation process in step 298.

If the decision in step 270 is positive, the installation manager proceeds to step 280. In step 280, the installation manager creates the installation signature (ISig) or hash 116 from the unique identification 114a, product identification 114b and licensee information 114d. The installation signature (ISig) 116 is then stored in the licensee's computer, in step 284. The installation signature stored in the computer is identified as $ISig_{pc}$ in step 288. A decision is then made, in step 290, whether the generation and storage of the installation signature $ISig_{pc}$ 116 is successful.

If the decision in step 290 is negative, the installation manager prompts the licensee, in step 294, whether to retry storing the installation signature ($ISig_{pc}$) 116. If the licensee's decision in step 294 is positive, the installation manager re-executes the process steps 284 and 288 accordingly. In another embodiment, a number of retry in step 294 is predetermined. If the decision in step 294 is negative, the installation manager proceeds to step 278 and performs an installation roll-back before ending the installation process in step 298.

If the decision in step 290 is positive, the installation is successful. Accordingly, the installation manager proceeds to end the new installation process B in step 298.

Figure 6:
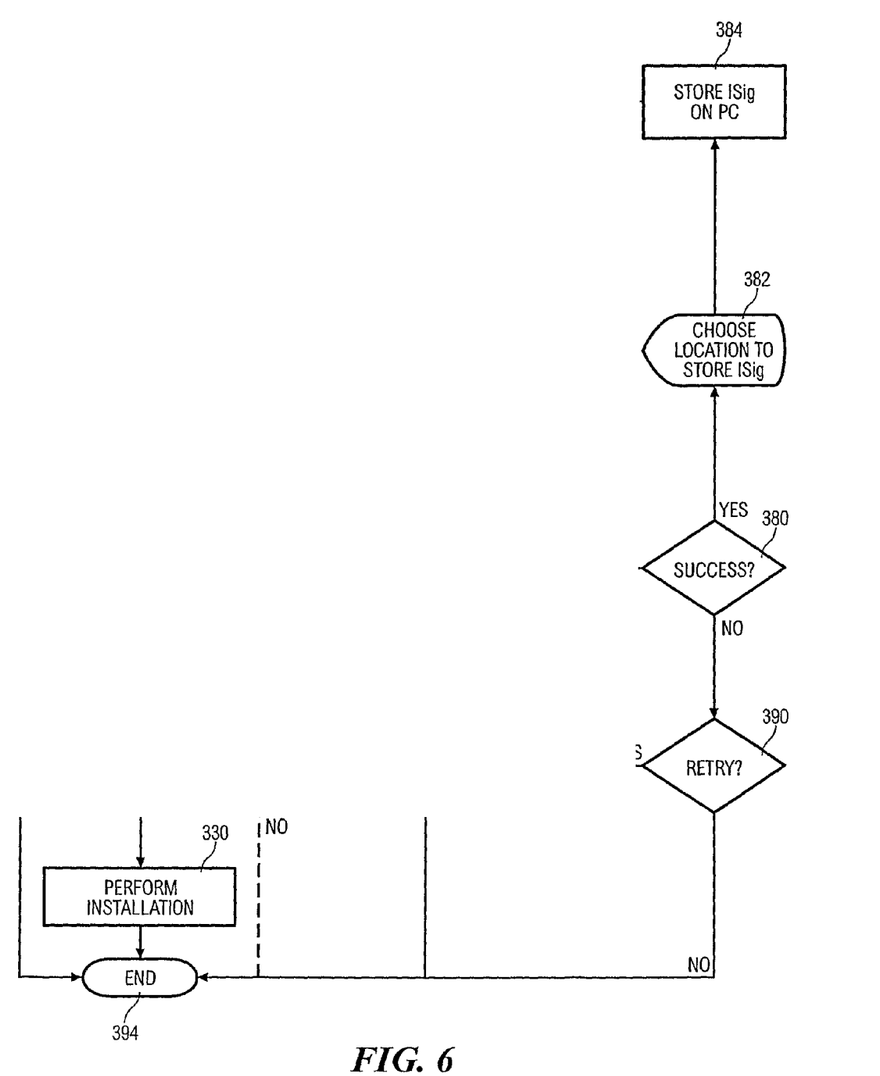
FIG. 6 illustrates a re-installation process (C) of a software package according to another embodiment of the present invention.

FIG. 6 illustrates a re-installation process of a software package according to another embodiment of the present invention. As shown in FIG. 6, the re-installation process C starts from step 300. In step 302, the installation manager selects the location of the installation signature (ISig) 116. By default, the installation signature ($ISig_{pc}$) 116 is located in a storage drive, such as a boot drive "C" of a computer. In step 304, the installation manager retrieves the $ISig_{pc}$ from the storage drive. A check is then made, in step 306, whether the $ISig_{pc}$ is found in the computer.

If the decision in step 306 is positive, the installation manager requests the RFID reader 158 to extract the unique identification 114a, product identification 114b and licensee information 114d from the RFID tag 110. An installation signature ($ISig_{tag}$) is then generated from the RFID tag 110 in step 310. The $ISig_{tag}$ is compared to the $ISig_{pc}$ in step 320 and a decision is made, in step 324.

If the result of comparison in step 320 is positive, meaning that the installation signatures from the computer and RFID are identical, the decision in step 324 would also be positive. Accordingly, the installation manager proceeds to complete the installation of the software package 100, in step 330, before ending the re-installation process C in step 394.

If the result of comparison in step 320 is negative, the installation signatures $ISig_{pc}$ and $ISig_{tag}$ are determined to be invalid in step 324. As a result, the installation manager ends the installation process in step 394.

In another embodiment, when the decision in step 324 is negative, the installation manager prompts the licensee whether to retry the re-installation process. If the licensee so wishes, the installation manager proceeds to step 340. If not, the installation manager proceeds to end the reinstallation process C in step 394.

If the $ISig_{pc}$ is not found in step 306, the installation manager proceeds to step 340. In step 340, the installation manager prompts the licensee whether to request for a new installation signature.

If the licensee declines, in step 340, to regenerate a new installation signature, the installation manager proceeds to end the re-installation process C in step 394. If the licensee wishes to regenerate a new installation signature, the installation manager proceeds to step 350. In step 350, process D for re-generating a new installation signature is initiated. Process D will be described under FIG. 7. A decision is then made, in step 380, whether the new installation signature is successfully re-generated.

If the decision in step 380 is positive, the installation manager prompts the licensee, in step 382, to choose a location to store the new installation signature. Upon the licensee entering a requested location, the installation manager stores the new installation signature (ISig) in the computer in step 384, and replaces the previous installation signature (ISig$_{pc}$) in step 386. Accordingly, the software re-installation process C continues from step 302.

If the decision in step 380 is negative, the installation manager prompts the licensee, in step 390, whether to re-try executing process D. If the licensee wishes, the installation manager executes step 350 again. If the licensee declines, the installation manager ends the reinstallation process in step 394.

Figure 7:
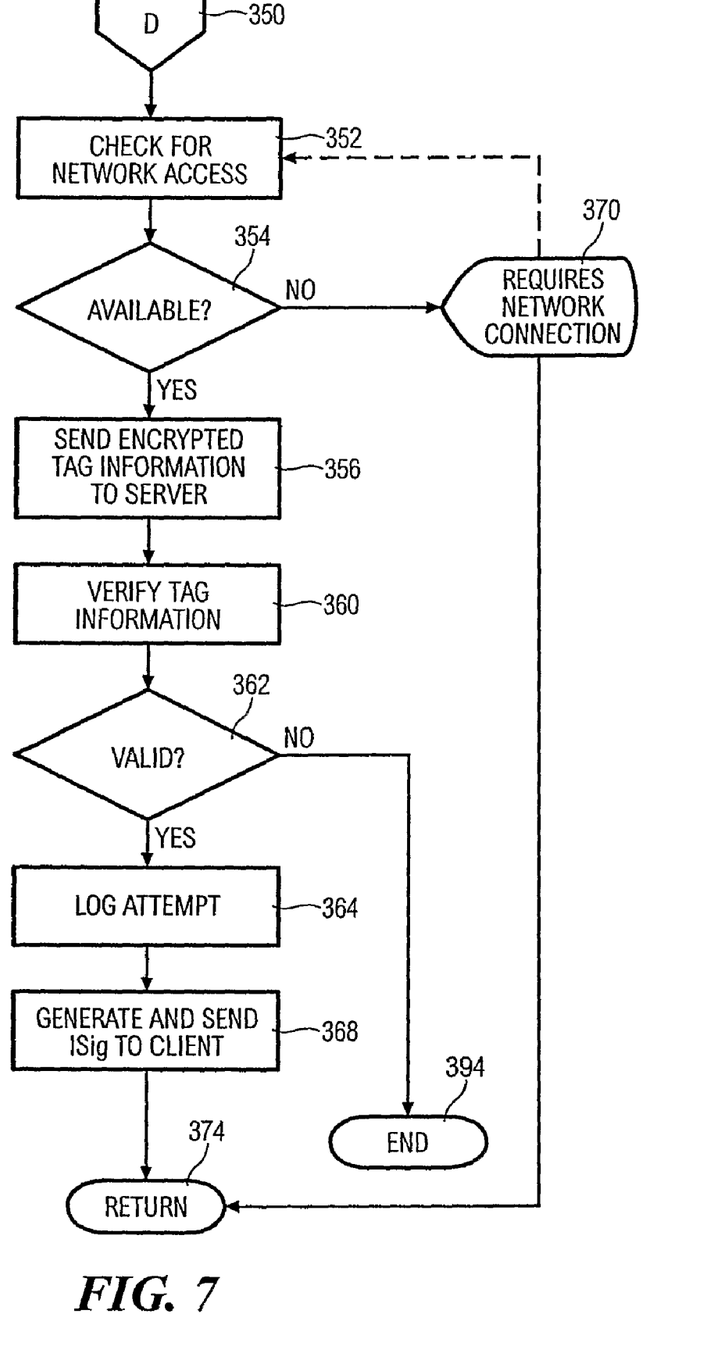
FIG. 7 illustrates an installation signature (ISig) regeneration process (D) according to another embodiment of the present invention.

FIG. 7 illustrates the installation signature regenerating process D according to another embodiment of the present invention. Reinstallation of a software may be required, for example, after one's computer hard disk clashes. It may also happen when a computer operating system need to be reinstalled, for example, after a virus attack and a copy of the ISig has not been copied on a portable drive. As shown in FIG. 7, the ISig re-generating process D starts from step 350. In step 352, the installation manager checks the network ports for any network connection, and a decision is made, in step 354, whether a network port is available.

If none of the network port is connected and the decision in step 354 is negative, the installation manager prompts the licensee, in step 370, to provide a network connection and the process control then jumps to step 374. Accordingly, the re-installation process continues through steps 380 and 390 (as shown in FIG. 6) and steps 352 and 354. In another embodiment, as shown in FIG. 7, the process control jumps to steps 352 and 354 from step 370.

If the decision in step 354 is positive, the installation manager proceeds to step 356. In step 356, the installation manager extracts the product installation and licensing key 114 from the RFID tag 110, encrypts the key and sends it to the licensor's server. With the information returned from the licensor's server, the installation manager verifies, in step 360, the product installation and licensing key 114 retrieved from the RFID tag 110. A decision is then made, in step 362, whether the product installation and licensing key 114 from the RFID tag 110 is valid.

If the decision in step 362 is positive, the installation manager keeps a log, in step 364, for each attempt in re-generating a new installation signature (ISig). The installation manager then proceeds to generate a new installation signature (ISig), in step 368, and returns process control, in step 374, to step 380 shown in FIG. 6. If the decision in step 362 is negative, the installation manager interrupts the installation signature regeneration process and proceeds to end process D in step 394.

Figure 8:
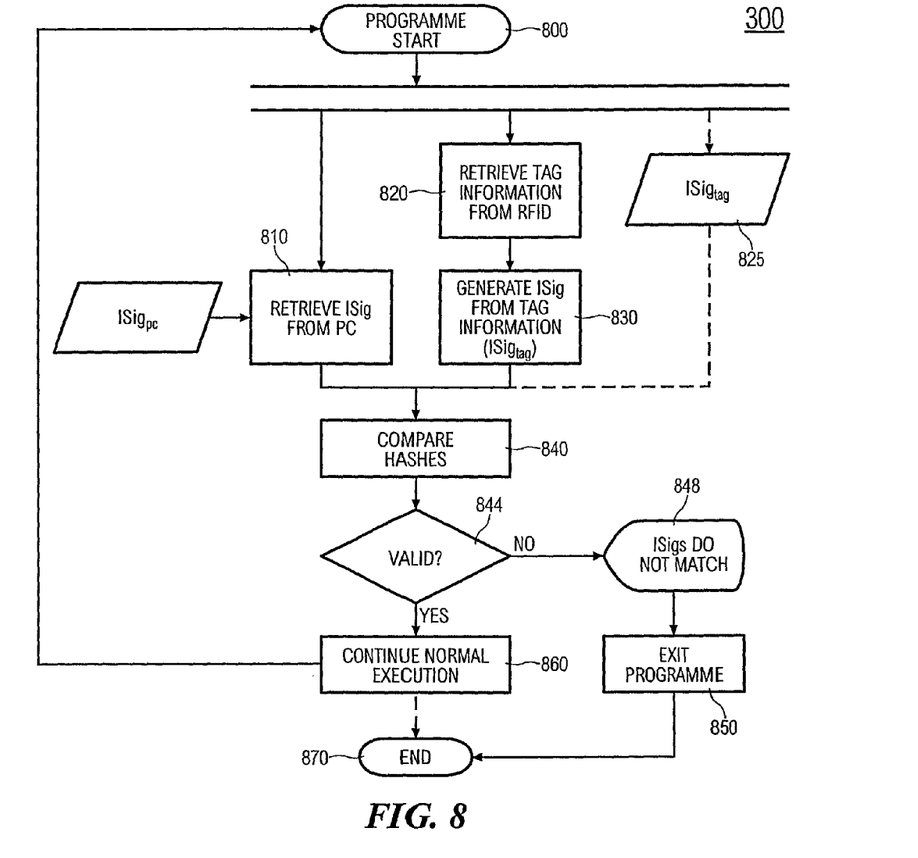
FIG. 8 illustrates a licensing control system according to another embodiment of the present invention.

FIG. 8 illustrates the licensing control of a software package 100 according to another embodiment of the present invention. The licensing control system 300 executes at regular predetermined intervals, and allows a licensee to continue operating the software package 100 as long as the installation signatures from both the computer and RFID tag 110 match each other. As shown in FIG. 8, the licensing control system 300 starts from step 800. In step 810, the licensing system 300 periodically retrieves the installation signature (ISig$_{pc}$) from the computer. At substantially the same time, the licensing system 300 also retrieves the unique identification 114$a$, product information 114$b$, and licensee information 114$d$ from the RFID tag 110 in step 820, and generates the installation signature (ISig$_{tag}$) from the RFID tag 110. In another embodiment, the licensing system 300 retrieves the installation signatures (ISig$_{tag}$) directly from the memory 118 of the RFID tag 110 in step 825, instead of re-processing the ISig from the RFID tag 110.

In step 840, the installation signatures from the computer and RFID tag are compared, and a decision is made, in step 844, whether the software license is still valid. If the decision in step 844 is positive, the licensing system 300 allows the software package 100 to continue operating. The licensing system 300 periodically repeats its control from step 800 after elapse of a predetermined time interval. In another embodiment, the licensing system periodically ends by executing step 870 after each cyclic licensing loop execution.

If the decision in step 844 is negative, and the installation signatures (ISig) from the computer and RFID tag 110 do not match (in step 848), the licensing control system 300 proceeds to step 850. In step 850, the licensing system 300 causes the software to exit, and the licensing system 300 to end in step 870.

Whilst this copyright protection system is described with a RFID reader 158 installed on the mother-board 154, the present invention is not so limited. The RFID reader 158 may be an external device, which is connectable to the CPU, for example, via a USB port or any I/O port with an appropriate port driver. In the later embodiment, transmitting and storing the licensee information as part of the installation and licensing key 114 in the memory chip 118 discourage users from making copies of a software and running the copies in separate machines.

Where a software package 100 is sold with multiple licenses, or so called site licenses, a number of RFID tags 110 corresponding to the number of licenses is included in the package. Each license number is stored as part of the licensee information 114$d$ in the installation and licensing key 114.

Figure 9:
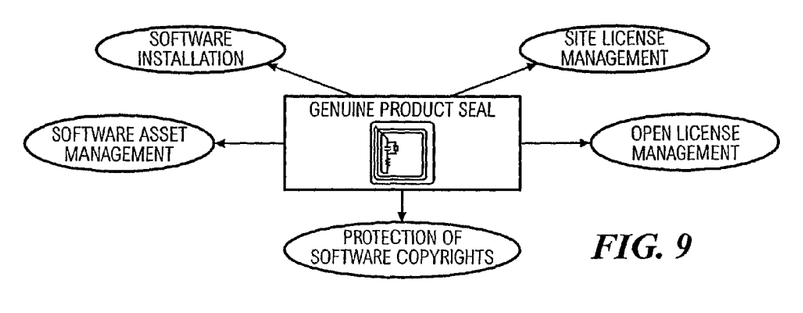
FIG. 9 illustrates various applications of the software and licensing system according to yet another embodiment of the present invention.

So far, the present invention has been described with respect to users installing and executing licensed copies of software packages. The present invention, therefore, provides protection of software copyrights and ensures more effective licensing control. With the present invention, other areas of application such as software asset and licensing management, as shown in FIG. 9, as part of an entire enterprise management system is also enabled. In such asset and licensing management, a licensee carries a portable RFID reader, interrogates each RFID tag 110 to extract each software product installation and licensing key 114 and sends the product identification and licensing information to a computer for administrative purposes.

While specific embodiments have been described and illustrated, it is understood that many changes, modifications, variations and combinations thereof could be made to the present invention without departing from the scope of the invention. For example, the RFID tag 110 may be provided with an area of weakness such that tampering with it would separate the memory chip 118 from the other parts of the tag. This would discourage attempts to circumvent software copyright protection.

The invention claimed is:

1. A software copyright protection and licensing system using radio-frequency identification (RFID), said system comprising:
   a computer-readable medium embedded with a software that is to be installed and executed in a computer, wherein the software includes an installation manager;
   a RFID tag, said RFID tag contains at least a product installation and licensing key of the software; and
   a RFID reader in communication with a central processing unit (CPU) of a computer and the RFID tag;

wherein during initial installation, when the computer-readable medium is inserted into the computer, the installation manager invokes the RFID reader which in turn interrogates the RFID tag to obtain the product installation and licensing key of the software, and requests a user to provide licensee information; after the software is installed, the licensee information is encrypted and sent to the RFID tag so that the product installation and licensing key is updated with the licensee information; then upon successful transmission of the licensee information to the RFID tag, the installation manager generates an installation signature (ISig) that is stored in the computer ($ISig_{pc}$); the installation is deemed successful if the generation and storage of the installation signature ISig is successful; and wherein, during reinstallation, the installation manager obtains the $ISig_{pc}$ from the computer and an $ISig_{tag}$ from the RFID tag that is synthesized from the product installation and licensing key and the updated licensee information, and then compares the $ISig_{pc}$ with the $ISig_{tag}$; if both tally, the software is reinstalled; if both do not tally, the software is not reinstalled.

2. A system according to claim 1, wherein the installation signature (ISig) comprises a unique identification and a product identification of the software in addition to licensee information.

3. A system according to claim 2, wherein the licensee information comprises one or more of the following: a license number and licensee's name, address and/or contact numbers.

4. A system according to claim 1, wherein a line of weakness surrounds a component of the RFID tag.

5. A system according to claim 1, wherein an area of weakness surrounds a component of the RFID tag.

6. A system according to claim 4, wherein the component of the RFID tag comprises one or more of the following: memory chip, resistor, capacitor and antenna.

7. A method of enforcing software copyright and license comprising:
   supplying a computer-readable medium embedded with a software that is to be installed and executed in a computer, wherein the software includes an installation manager;
   supplying a RFID tag containing at least a product installation and licensing key of the software;
   communicating a RFID reader with a central processing unit (CPU) of the computer and the RFID tag;
   interrogating the RFID tag to obtain the product installation and licensing key;
   extracting licensee information by the installation manager from the product installation and licensing key;
   if no licensee information is present in the product installation and licensing key, the following steps for installation:
      requesting licensee information from a user;
      installing the software into the computer;
      sending the licensee information to the RFID tag to be updated in the product installation and licensing key in the RFID tag;
      generating an installation signature (ISig) by the installation manager using the product installation and licensing; key and licensee information upon successful transmission of the licensee information to the RFID tag; and
      storing the ISig into the computer as $ISig_{pc}$; whereby the installation is deemed successful if the generation and storage of the installation signature (ISig) is successful; or
   if the licensee information is present in the product installation and licensing key, the following steps for reinstallation:
      retrieving the stored $ISig_{pc}$ from the computer;
      generating the installation signature from the product installation and licensing key ($ISig_{tag}$); and
      comparing the $ISig_{pc}$ with the $ISig_{tag}$; if both tally, reinstalling the software into the computer.

8. A method according to claim 7, wherein the installation signature (ISig) comprises a unique identification and a product identification of the software, in addition to licensee information.

9. A method according to claim 8, wherein the licensee information comprises one or more of the following: a license number and licensee's name, address and/or contact number.

10. A method according to claim 7, wherein a line of weakness surrounds a component of the RFID tag.

11. A method according to claim 7, wherein an area of weakness surrounds a component of the RFID tag.

12. A method according to claim 10, wherein the component of the RFID tag comprises one or more of the following: memory chip, resistor, capacitor and antenna.

13. A method according to claim 7, wherein an installation signature is found in the CPU, thereby allowing reinstallation of the software provided the RFID reader is communicable with the RFID tag.

14. A method according to claim 13, further generating an installation signature when the previous installation signature cannot be located in the CPU provided that the previous software installation was registered with the licensor's server.

15. A computer product comprising:
   a software package;
   a RFID tag accompanying the software package, said RFID tag containing at least a product installation and licensing key for installing the software; and
   an amount of adhesive for attaching the RFID tag onto a casing of a central processing unit (CPU) of a computer in which the software is operable;
   wherein a RFID reader in communication with the CPU interrogates the RFID tag for the software's product installation and licensing key and generates an installation signature ($ISig_{tag}$) from the product installation and licensing key, and allowing execution of the software when the $ISig_{tag}$ tallies with the installation signature ($ISig_{pc}$) stored in the CPU when the software was first installed, or denies execution when the installation signatures do not tally.

16. A computer product according to claim 15, wherein an installation signature is written into the RFID tag and CPU.

17. A computer product according to claim 15, wherein a line of weakness surrounds a component of the RFID tag.

18. A computer product according to claim 15, wherein an area of weakness surrounds a component of the RFID tag.

19. A computer product according to claim 17, wherein the component of the RFID tag comprises one or more of the following: memory chip, resistor, capacitor and antenna.

20. A system according to claim 5, wherein the component of the RFID tag comprises one or more of the following: memory chip, resistor, capacitor and antenna.

* * * * *